US008369337B1

(12) United States Patent
Singh et al.

(10) Patent No.: US 8,369,337 B1
(45) Date of Patent: Feb. 5, 2013

(54) METHODS AND DEVICES FOR ASSIGNING A WIRELESS COMMUNICATION DEVICE TO A WIRELESS COVERAGE AREA BASED ON EARLY TERMINATION GAIN

(75) Inventors: Anil Singh, Leawood, KS (US); Samuel Odedina, Chula Vista, CA (US); Abhishek Lall, Manhattan, KS (US); Cheryl M. Nichols, Raymore, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 712 days.

(21) Appl. No.: 12/613,184

(22) Filed: Nov. 5, 2009

(51) Int. Cl.
*H04L 12/28* (2006.01)

(52) U.S. Cl. ............. 370/395.2; 370/332; 370/338; 370/341; 370/337; 370/347; 370/395.3; 370/436; 370/437

(58) Field of Classification Search .......... 370/328, 370/329, 331, 332, 338, 341, 337, 347, 395.2, 370/395.21, 395.3, 436, 437
See application file for complete search history.

(56) References Cited

U.S. PATENT DOCUMENTS

| | | | |
|---|---|---|---|
| 6,308,294 B1 | 10/2001 | Ghosh et al. | |
| 6,631,127 B1 | 10/2003 | Ahmed et al. | |
| 6,647,002 B1 | 11/2003 | Suda et al. | |
| 6,697,987 B2 | 2/2004 | Lee et al. | |
| 6,925,132 B2 | 8/2005 | Song et al. | |
| 7,002,993 B1 | 2/2006 | Mohaban et al. | |
| 7,136,929 B2 | 11/2006 | Koprivica | |
| 7,206,280 B1 | 4/2007 | Khan et al. | |
| 7,388,919 B2 | 6/2008 | Varma et al. | |
| 7,447,968 B2 | 11/2008 | Ha et al. | |
| 7,715,347 B2 | 5/2010 | Yoon et al. | |
| 7,805,140 B2 * | 9/2010 | Friday et al. | 455/436 |
| 2001/0012785 A1 | 8/2001 | Esteves et al. | |
| 2004/0047348 A1 | 3/2004 | O'Neill | |
| 2004/0141525 A1 | 7/2004 | Bhushan et al. | |
| 2004/0179475 A1 | 9/2004 | Hwang et al. | |
| 2005/0058151 A1 | 3/2005 | Yeh | |
| 2006/0013216 A1 | 1/2006 | Rajkotia et al. | |
| 2006/0109810 A1 | 5/2006 | Au et al. | |
| 2006/0256740 A1 | 11/2006 | Koski | |
| 2007/0070952 A1 | 3/2007 | Yoon et al. | |
| 2007/0091816 A1 | 4/2007 | Lee et al. | |
| 2007/0110095 A1 | 5/2007 | Attar et al. | |
| 2007/0168822 A1 | 7/2007 | Vitebsky et al. | |
| 2007/0214400 A1 | 9/2007 | Smith et al. | |

(Continued)

FOREIGN PATENT DOCUMENTS

| WO | WO 2007/059523 | 5/2007 |
|---|---|---|
| WO | WO 2007059523 | 5/2007 |

OTHER PUBLICATIONS

Lim et al., IEEE 802.16 Broadband Wireless Access Working Group <http://ieee802.org/16>, "Aggregated H-ARQ", Nov. 4, 2004.

(Continued)

*Primary Examiner* — Christopher Grey

(57) ABSTRACT

Methods and systems for assigning a wireless communication device (WCD) to a wireless coverage area based on early termination gain (ETG) are presented. In particular, a RAN may receive a request, from a WCD, for an assignment to one of a plurality of wireless coverage areas. In response to receiving the request, the RAN may select a wireless coverage area of the plurality that has a highest ETG, and assign the WCD to the selected wireless coverage area. Prior to selecting this wireless coverage area, the RAN may optionally remove one or more wireless coverage areas with high utilization from consideration.

20 Claims, 8 Drawing Sheets

U.S. PATENT DOCUMENTS

| | | |
|---|---|---|
| 2007/0300120 A1 | 12/2007 | Kim et al. |
| 2008/0130643 A1 | 6/2008 | Jain et al. |
| 2008/0168321 A1 | 7/2008 | Lim et al. |
| 2008/0194284 A1 | 8/2008 | Choi et al. |
| 2008/0273500 A1* | 11/2008 | Suh et al. ................ 370/331 |
| 2009/0016265 A1 | 1/2009 | Katayama et al. |
| 2009/0109930 A1* | 4/2009 | Suh et al. ................ 370/332 |
| 2009/0129276 A1 | 5/2009 | Dendy |
| 2009/0319854 A1 | 12/2009 | Qian et al. |
| 2009/0327443 A1 | 12/2009 | Pawar et al. |
| 2010/0080174 A1* | 4/2010 | Zhu et al. ................ 370/328 |
| 2010/0091735 A1 | 4/2010 | Kim et al. |
| 2010/0135156 A1 | 6/2010 | Sarkar |

OTHER PUBLICATIONS

IEEE 802.16 Broadband Wireless Access Working Group <http://ieee802.org/16>, Aggregated H-ARQ, Lim Geunhwi, et al., Nov. 4, 2004.

* cited by examiner

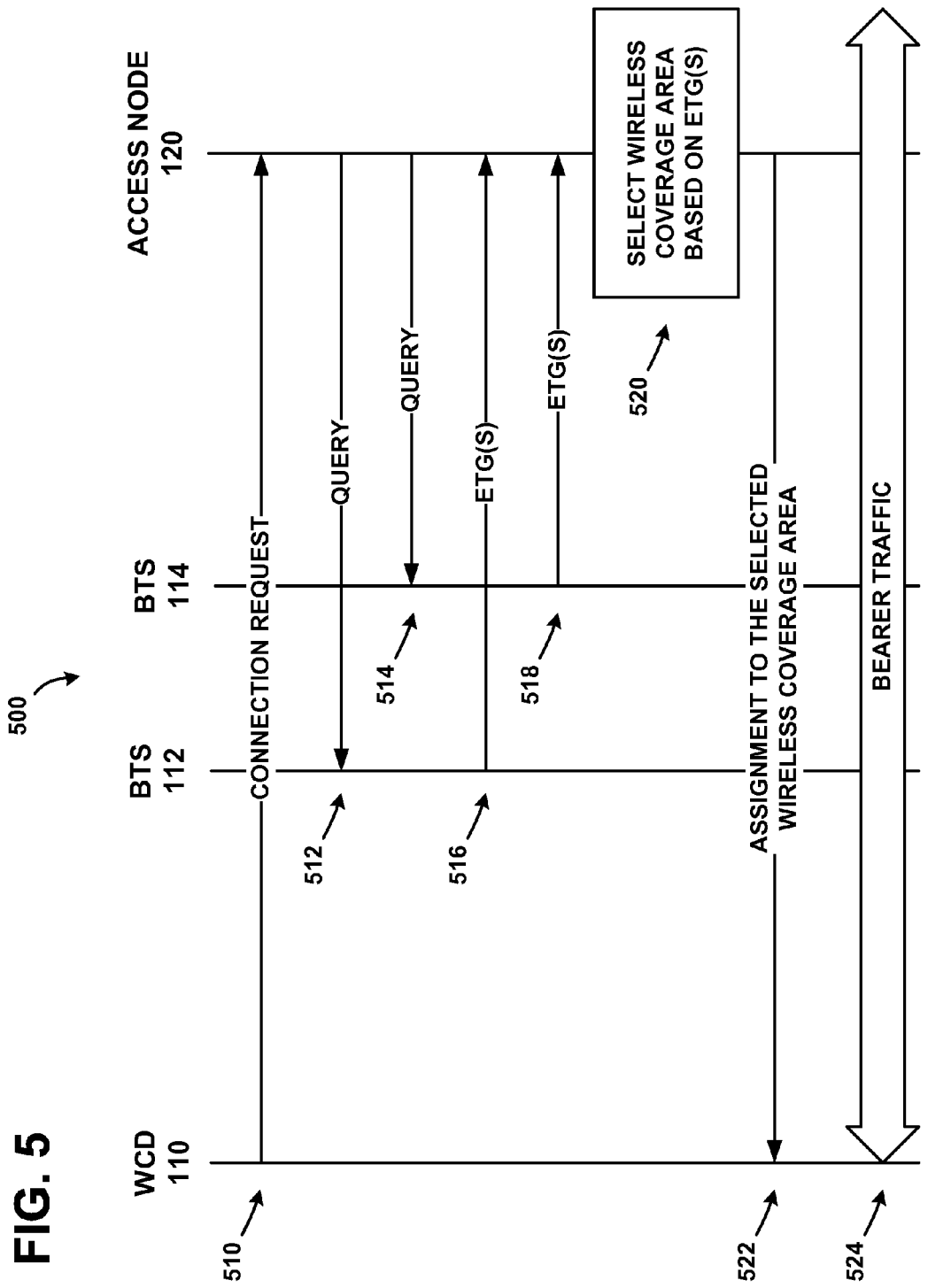

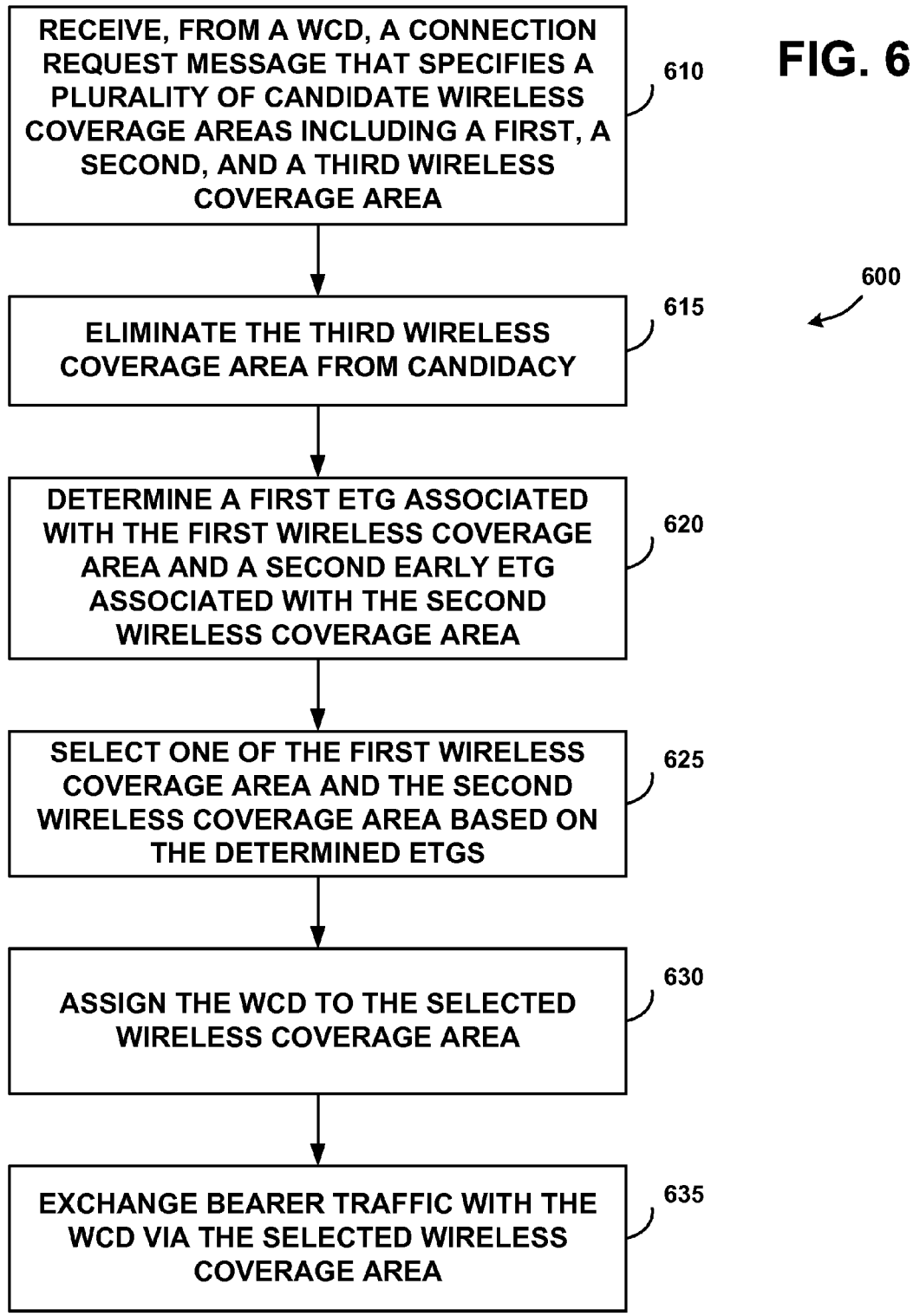

METHODS AND DEVICES FOR ASSIGNING A WIRELESS COMMUNICATION DEVICE TO A WIRELESS COVERAGE AREA BASED ON EARLY TERMINATION GAIN

BACKGROUND

A radio access network (RAN) typically includes one or more base transceiver stations (BTSs) that radiate to define wireless coverage areas. From time to time, a wireless communication device (WCD), such as a mobile phone or laptop computer, may request wireless service from the RAN. In response to the request, the RAN may assign the WCD to one of the RAN's wireless coverage areas, so that the WCD can exchange data, voice, video, or other media with various network endpoints.

In many cases, there may be multiple candidate wireless coverage areas to which the RAN may assign the WCD. Thus, the RAN may have to determine, or at least estimate, which wireless coverage area might best serve the WCD's needs. To that end, the WCD may measure the strengths at which it receives signals from each wireless coverage area, and report this information to the RAN. Then, the RAN may make the wireless coverage area assignment based on these reported strengths. However, making the assignment in such a way can lead to situations where some wireless coverage areas are heavily loaded while other wireless coverage areas are lightly loaded.

OVERVIEW

Methods and devices for assigning a WCD to a wireless coverage area are presented. Preferably, the assignment is made based on the RAN determining an early termination gain (ETG) exhibited by each candidate wireless coverage area, and assigning the WCD to the candidate wireless coverage area with the best ETG. In this way, the RAN may more effectively balance load between the candidate wireless coverage areas.

ETG, which will be described in detail later in this specification, may be a measure of how efficiently WCDs use the capacity of their assigned wireless coverage areas. In general, the greater the ETG exhibited by a wireless coverage area, the more efficiently the wireless coverage area's capacity is being used, and therefore the more spare capacity the wireless coverage area may have. Thus, it behooves the RAN to consider this spare capacity in addition to signal strength when assigning WCDs to wireless coverage areas.

However, the RAN may take factors other than ETG into consideration as well. For instance, each wireless coverage area may include a forward link for carrying transmissions from the RAN to WCDs, and a reverse link for carrying transmissions from WCDs to the RAN. If, for a given wireless coverage area, the utilization of the forward link or the utilization of the reverse link exceeds a respective utilization threshold, the wireless coverage area may be too heavily utilized to take on more traffic, regardless of the efficiency reflected by its ETG.

Likewise, each wireless coverage area may also connect to one or more other networks (such as private networks and/or networks on the Internet) via at least one backhaul link. If the utilization of such backhaul link(s) exceeds a backhaul link threshold, these backhaul link(s) may be congested to the point that they could limit the data rate of WCDs that use the wireless coverage area. Thus, when backhaul link utilization for a given wireless coverage exceeds this threshold, it may be advantageous for the RAN to assign WCDs to a different wireless coverage area, regardless of the given wireless coverage area's ETG.

Accordingly, in an exemplary embodiment, a RAN may radiate to define wireless coverage areas. Each of these wireless coverage areas may be capable of providing wireless service to a WCD. Furthermore, each wireless coverage area preferably comprises bearer channels for exchanging voice, data, video and other media with WCDs, as well as signaling channels for coordinating communications with these WCDs.

Thus, in order to communicate with other networked endpoints, the WCD may need to establish a bearer channel. To this end, the WCD may transmit, on a signaling channel to the RAN, a connection request message specifying a plurality of candidate wireless coverage areas. The connection request message may function to request assignment of the WCD to any one of the specified candidate wireless coverage areas.

In order to narrow down the number of candidate wireless coverage areas, the RAN may eliminate heavily used wireless coverage areas from candidacy. For instance, the RAN may determine a utilization of each of the candidate wireless coverage areas, and eliminate any wireless coverage area from candidacy if that wireless coverage area exhibits a utilization above a predetermined threshold.

Then, the RAN may determine an ETG of each of the remaining candidate wireless coverage areas. Further, the RAN may select the candidate wireless coverage area with the highest ETG of all of the remaining candidate wireless coverage areas, and then assign the WCD to the selected wireless coverage area. Once the assignment is complete, the WCD may exchange bearer traffic with the RAN using one or more bearer channels on the selected wireless coverage area.

These and other aspects and advantages will become apparent to those of ordinary skill in the art by reading the following detailed description, with reference where appropriate to the accompanying drawings. Further, it should be understood that the foregoing overview is merely exemplary and is not intended to limit the scope of the invention as claimed.

BRIEF DESCRIPTION OF THE DRAWINGS

FIG. 5 is a call flow, in accordance with an exemplary embodiment;

FIG. 6 is a flow chart, in accordance with an exemplary embodiment; and

DESCRIPTION

In accordance with exemplary embodiments, methods and devices for a RAN to assign a WCD to a wireless coverage area based on ETG are presented. In particular, the RAN may select a wireless coverage area with the highest ETG from a group one or more candidate wireless coverage areas. Preferably, the RAN determines the ETG of each candidate wireless coverage area based on the efficiency with which the WCD and RAN communicate via a hybrid automatic repeat request (ARQ) protocol. However, other ways of determining ETG are also possible.

I. System Architecture

Figure 1:
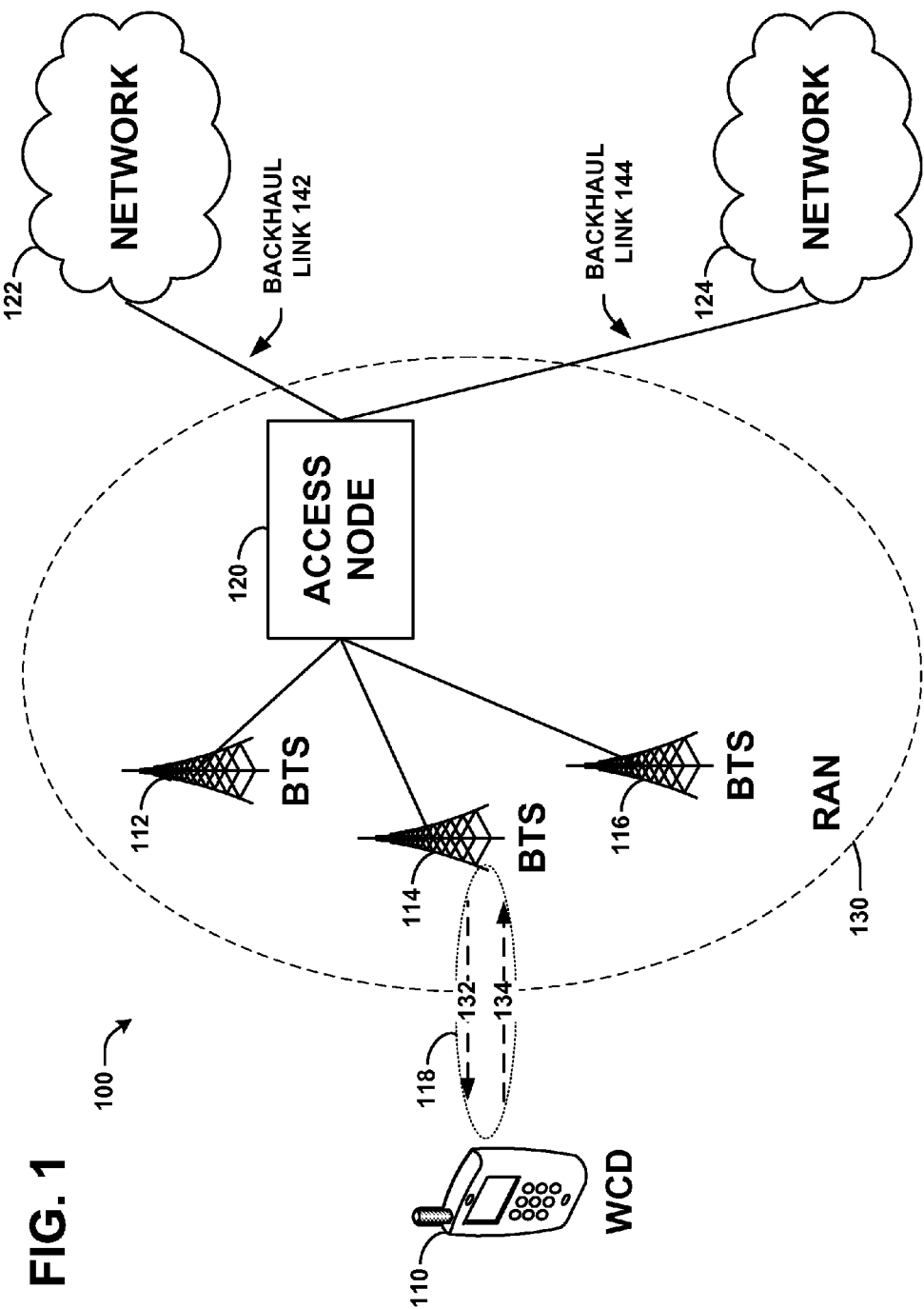
FIG. 1 depicts a wireless communication system, in accordance with an exemplary embodiment.

FIG. 1 is a simplified block diagram of example communication network 100, in which example embodiments may be employed. Network 100 may include base transceiver stations (BTSs) 112, 114, and 116, each of which can communicate with WCDs via one or more wireless coverage areas. Thus, WCDs may be fixed or mobile communication devices, such as cell phones, portable audio players, laptop computers, personal digital assistants, or wireless routers. In addition to having at least one communication interface, WCDs may have other input/output interfaces, such as keyboards, touchscreens, digital displays, speakers, and so on.

Each wireless coverage area may include a forward link for carrying transmissions from the RAN to WCDs, and a reverse link for carrying transmissions from WCDs to the RAN. For instance, in FIG. 1, BTS 114 radiates to define wireless coverage area 118. BTS 114 provides wireless service to WCD 110 via the air interface of wireless coverage area 118, and WCD 110 may use forward link 132 and reverse link 134 of wireless coverage area 118 to communicate with BTS 114. Accordingly, WCD 110 may exchange signaling, voice, data, video, or other media with BTS 114 through these forward and reverse links. Although only one WCD is shown in FIG. 1, wireless coverage areas, such as wireless coverage area 118 may be able to provide wireless service to multiple WCDs simultaneously.

Each BTS may be connected to one or more access nodes, such as access node 120. Each access node may control multiple BTSs by determining how each BTS manages the WCDs using the respective BTS's wireless coverage areas. In FIG. 1, access node 120 controls BTS 112, BTS 114, and BTS 116. In this regard, an access node may instruct a BTS to assign bearer channels to a WCD, increase or decrease power to a WCD, or handoff a WCD to a different BTS. Further, voice and data traffic to and from each WCD may flow through an access node. An access node may also incorporate functions traditionally performed by a base station controller (BSC) or a radio network controller (RNC). Alternatively, an access node may comprise a BSC or RNC.

BTS 112, BTS 114, BTS 116, and access node 120 may be collectively referred to as a RAN, and these elements are designated in FIG. 1 as components of RAN 130. However, a RAN may include or connect to other devices not shown in FIG. 1, such as a packet data serving node (PDSN), a mobile switching center (MSC), an IP multimedia subsystem (IMS) infrastructure, and/or a media gateway. In general, a RAN may include only a few specific components, such as a single access node and a single BTS, or may include any number of access nodes, BTSs, and other devices. Additionally, RAN components may be physically or logically integrated, combined, or divided amongst fewer or more components than shown in FIG. 1. Thus, it should be understood that any communications described herein as being between a WCD and a RAN may take place between a WCD and any component of a RAN. For example, these communications could take place between WCD 110 and access node 120, or between WCD 110 and BTS 112.

Furthermore, each access node may connect with one or more networks via at least one backhaul link. For instance, in FIG. 1, access node 120 connects to network 122 via backhaul link 142, and also connects to network 124 via backhaul link 144. Each of network 122 and network 124 may be on the Internet, or may be a private network (e.g., either of these networks may be an Internet service provider network or a corporate network). Nonetheless, access node 120 could connect to more or fewer networks via more or fewer backhaul links.

Backhaul links 142 and 144 may operate according to various forms of local area or wide area wireline or wireless technologies. For example, these backhaul links could operate according to Ethernet, Asynchronous Transfer Mode (ATM), Synchronous Optical Network (SONET), or T-Carrier protocols. Alternatively or additionally, these backhaul links could be satellite links, or could operate according to various types of wireless protocols. Moreover, other links, including some not shown, may be referred to as backhaul links. For instance, links between a BTS and an access node may be considered backhaul links. Thus, the term "backhaul link" may refer to any link that may be used to transport communication involving WCD 110.

The entity or entities of RAN 130 preferably include at least one processor, data storage, and program instructions stored in the data storage and executable by the processor to carry out RAN functions described herein. Similarly, a WCD preferably includes at least one processor, data storage, and program instructions stored in the data storage and executable by the processor to carry out WCD functions. Furthermore, the WCDs and RAN 130 may operate and communicate with each other in accordance to various types of wireless protocols, such as Code Division Multiple Access (CDMA), Worldwide Interoperability for Microwave Access (WIMAX®), Universal Mobile Telecommunications System (UMTS), Long Term Evolution (LTE®), 802.11 (WIFI®), or other protocols now known or later developed.

Thus, in accordance with the arrangement of network 100, WCDs may use the wireless coverage areas defined by BTSs of a RAN, as well as backhaul links in the RAN or between the RAN and one or more networks, to communicate with one or more networked endpoints. These endpoints may include other WCDs, e-mail servers, world wide web servers, gaming servers, media servers, media gateways, and/or location-based services. Therefore, RAN 130 may enable a user of a WCD to make voice or multimedia calls, and use text messaging, email, web browsing, and various additional types of applications.

II. Wireless Coverage Area Arrangements and Assignment

In order to facilitate smooth operation of these and other applications, a RAN may attempt to assign a WCD to a wireless coverage area with sufficient capacity to serve the WCD's needs. There are at least two situations in which a RAN may perform such an assignment: when an idle WCD is requesting a bearer channel, and when a WCD that already has a bearer channel in a wireless coverage area is requesting a handoff to a different wireless coverage area.

Typically, an idle WCD is not assigned any bearer channels. (Note that even if a WCD is not allocated any bearer channels, the WCD may be communicating with the RAN via one or more wireless coverage areas on one or more signaling channels.) For instance, the WCD may not be engaged in any bearer communication sessions, or the WCD may have recently been powered on. Thus, in this first situation, the WCD may request a bearer channel in order to communicate.

Similarly, a WCD that is served by a bearer channel of a given wireless coverage area may determine that the coverage quality of the given wireless coverage area is inadequate. For example, the WCD may monitor the signal strength of a pilot channel associated with the given wireless coverage area, as well as signal strengths of pilot channels associated with other nearby wireless coverage areas. The WCD may determine that the signal strength of the given wireless coverage area (as represented by the signal strength of its pilot channel) is too low. Alternatively, the WCD may determine that the signal strength of the given wireless coverage area is significantly lower than that of at least one of the other wireless coverage areas. This determination may also be made based on the RAN comparing the signal strengths of the pilot channel of the given wireless coverage area with those of the pilot channels of the other wireless coverage areas. Thus, in this second situation, the WCD may request a bearer channel of a different wireless coverage area in order to avoid being potentially subjected to poor wireless service.

Regardless of why the WCD is requesting a bearer channel on a wireless coverage area, the RAN preferably responds to the WCD's request by selecting a wireless coverage area from a set of one or more candidate wireless coverage areas, and assigning the WCD to the selected wireless coverage area. Thus, the RAN may need to determine which wireless coverage area of several candidates to select.

Figure 2:
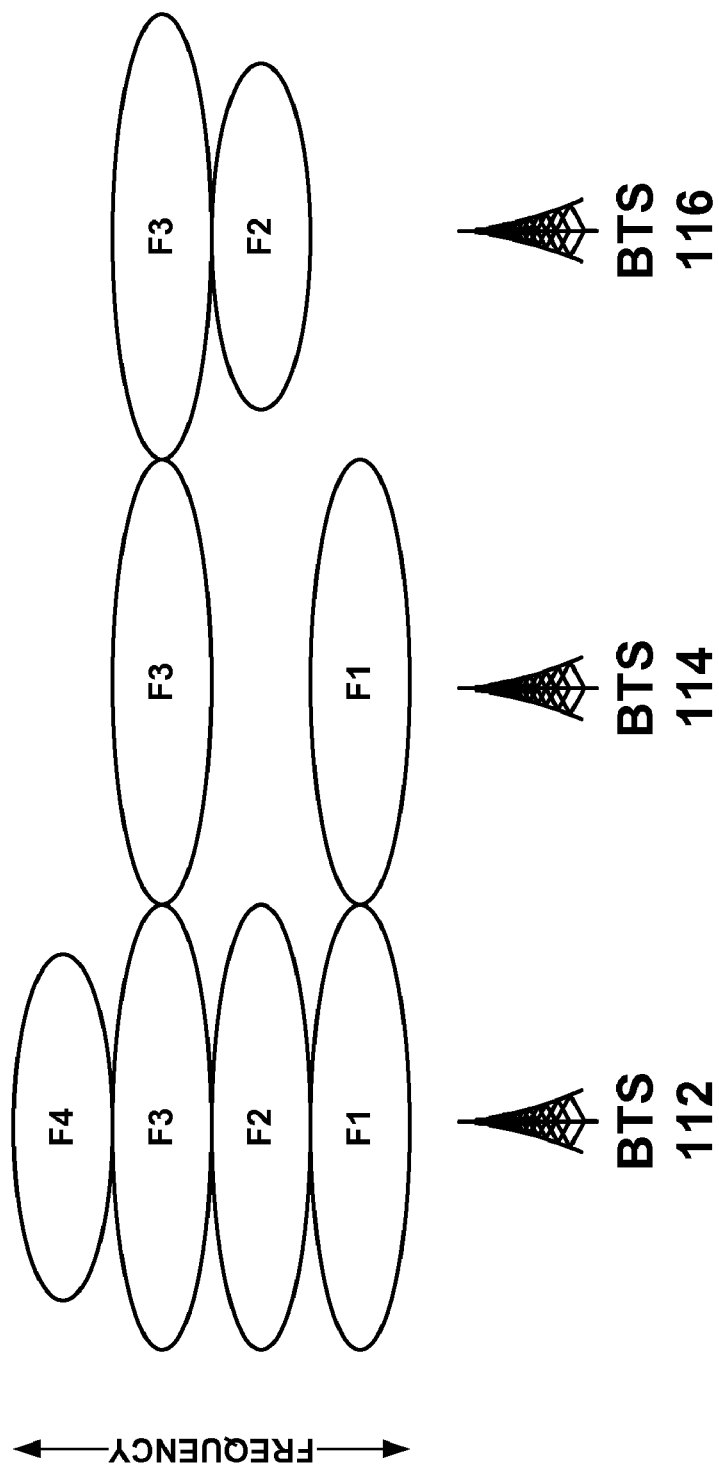
FIG. 2 depicts an arrangement of wireless coverage areas, in accordance with an exemplary embodiment.

In order to further illustrate how a RAN may make such a decision, FIG. 2 depicts example wireless coverage areas defined by BTS 112, BTS 114, and BTS 114. BTS 112 defines four wireless coverage areas, one defined using each of carrier frequencies F1, F2, F3, and F4. Preferably, these carrier frequencies are separated by sufficiently large guard bands so that BTS 112 can communicate simultaneously with WCDs on each carrier frequency without substantial inter-carrier interference.

BTS 114 defines two wireless coverage areas, one defined using carrier frequency F1 and the other defined using carrier frequency F3. BTS 116 also defines two wireless coverage areas, one defined using carrier frequency F2 and the other defined using carrier frequency F3. As depicted in FIG. 2, carrier frequency F1 may be a lower frequency than carrier frequency F2, carrier frequency F2 may be a lower frequency than carrier frequency F3, and carrier frequency F3 may be a lower frequency than carrier frequency F4. However, other arrangements are possible without departing from the spirit of the embodiments herein.

In addition to being associated with a carrier frequency, a wireless coverage area may have other identifying characteristics. For instance, in a CDMA wireless network, each wireless coverage area may be associated with a locally-unique pseudo-noise (PN) code. Typically, a PN code is a sequence of bits that appears to be random. A RAN may use a wireless coverage area's PN code to modulate an original signal transmitted on the wireless coverage area's carrier frequency into a wideband signal that resembles spectral noise. A WCD receiving this modulated signal may apply the wireless coverage area's PN code to demodulate the wideband signal back into the original signal.

It should be understood that each wireless coverage area defined by a given BTS may be of a different size and/or shape. For instance, as depicted in FIG. 2, the wireless coverage area defined by BTS 112 on carrier frequency F4 may be smaller than the other wireless coverage areas defined by BTS 112. Similarly, the wireless coverage area defined by BTS 116 on carrier frequency F2 may be smaller than the wireless coverage area defined by BTS 116 on carrier frequency F3.

Additionally, some BTSs may be physically neighboring one another, and arranged to define at least some wireless coverage areas that provide continuous coverage across the physical locations covered by these BTSs. For example, BTS 112 and BTS 114 both define wireless coverage areas on carrier frequencies F1 and F3 such that these wireless coverage areas are adjacent to one another.

Thus, there may be five candidate wireless coverage areas for a WCD that powers up between, near, or at the coverage borders of BTS 112 and BTS 114 (for sake of argument, assume that the wireless coverage area of BTS 112 that operates on carrier frequency F4 is not available to the WCD). RAN 130 may assign the WCD to one of the wireless coverage areas of BTS 112 that operate on carrier frequencies F1, F2, or F3, or one of the wireless coverage areas of BTS 114 that operate on carrier frequencies F1 or F3.

Therefore, the RAN may select one of these candidate wireless coverage areas to serve the WCD based on one or more factors, so that, after the assignment, the WCD is likely to experience satisfactory wireless service. The one or more factors may include, but are not limited to, a measured ETG of each candidate wireless coverage area and a utilization of each wireless coverage area. In the following sections, each of these factors is described in more detail.

III. Early Termination Gain (ETG)

In order to appreciate what ETG is and how the RAN can use it to determine a transmission efficiency associated with each candidate wireless coverage area, it is helpful to first understand how transmissions may occur on wireless channels. Preferably, RAN 130 communicates with WCD 110, as well as any other WCDs served by RAN 130, using time-division multiplexing (TDM) on its forward links. Thus, each candidate wireless coverage area may comprise one or more forward links, and multiple WCDs may share the capacity of each forward link via TDM. However, the broad concept of ETG may apply to non-TDM forward links as well.

The RAN may schedule transmissions to WCDs in TDM slots on each forward link. Each TDM slot may contain one or more symbols transmitted by the RAN, and a contiguous grouping of TDM slots may be referred to as a frame. Alternatively, a frame may be divided into two or more sub-frames that are interleaved with each other so that the TDM slots in a given sub-frame are not contiguous.

Each transmitted symbol may be a waveform that represents one or more bits (e.g., a symbol may represent a string of zeros and/or ones). The types of waveforms available for use on a given forward link may be based on the encoding and modulation that the given forward link is capable of supporting. For example, if the forward link is capable of supporting quadrature phase shift keying (QPSK) modulation, then each symbol in a slot may encode 2 bits. Alternatively, the forward link may be capable of supporting quadrature amplitude modulation schemes (QAM), such as 64-QAM. For instance, using 64-QAM may result in each symbol encoding 6 bits. Of course, other encoding schemes beside QPSK and 64-QAM could be used.

Figure 3:
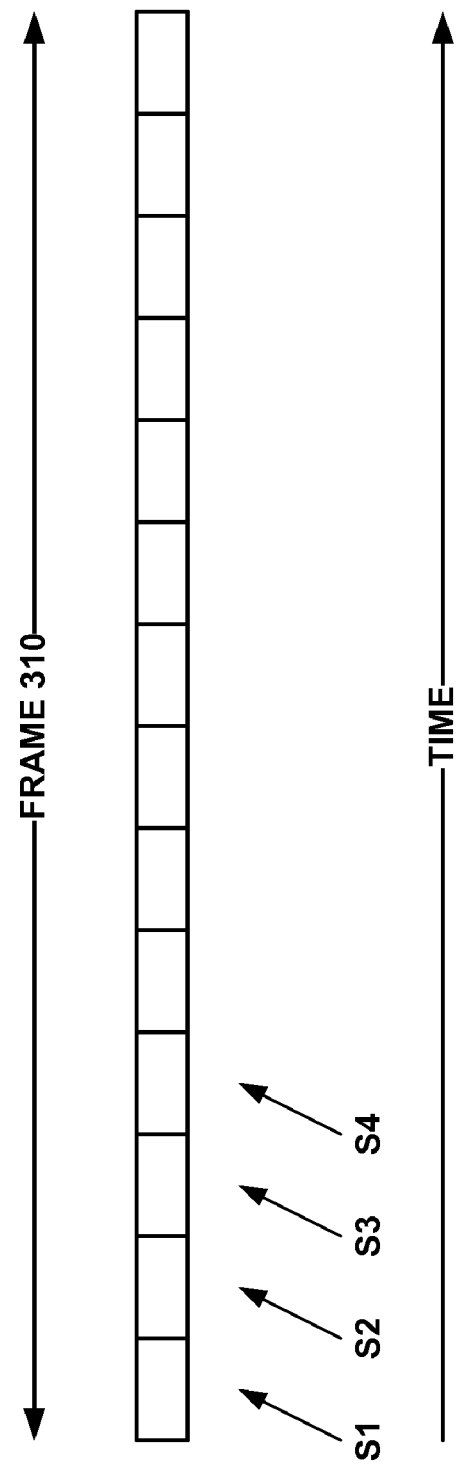
FIG. 3 depicts a time division multiplexed channel, in accordance with an exemplary embodiment.

FIG. 3 provides an illustrative visualization of a forward link operating according to TDM. In FIG. 3, time is represented on the x axis, flowing from left to right. Frame 310 of TDM slots for the forward link includes 14 forward direction TDM slots. The first four of these slots are labeled S1, S2, S3, and S4, respectively. Thus, for example, in slot S1, RAN 130 may transmit one or more symbols on the forward link. RAN 130 may transmit one or more symbols on the forward link again in slots, S2, S3, and S4, as well.

FIG. 3 illustrates a form of communication that may be referred to as frequency-division duplexing (FDD). In an FDD system, forward links may operate on a different carrier frequency than reverse links. However, FIG. 3 illustrates FDD only for purposes of example. The embodiments herein could alternatively operate according to time-division duplexing (TDD). In such a system, a portion of the time in a TDM frame may be reserved for a RAN to transmit to WCDs (i.e., forward direction transmissions that take place on a forward link), and another portion of the time may be reserved for the RAN to receive from WCDs (i.e., reverse direction transmissions that take place on a reverse link). Thus, a TDM frame, such as frame 310, may contain only forward direction slots of a logical forward link, only reverse direction slots of a logical reverse link, or some combination of both.

Furthermore, frame 310 could have more or fewer slots, and each slot could support the transmission or reception of any number of symbols. If, for instance, each slot in frame 310 contains 4 symbols, then RAN 130 could transmit a total of 56 symbols on the forward link during frame 310. Thus, assuming 6 bits per symbol, the peak forward direction capacity of frame 310 is 336 bits. If frame 310 is 1 millisecond in length, then the total forward direction bitrate would be 336,000 bits per second. However, if RAN 130 uses a different number of bits per symbol, symbols per slot, or slots per frame, the total forward direction bitrate may also be different.

Generally speaking, it is desirable to encode as many bits as possible in a given symbol. Doing so increases the efficiency and the data rate of a communication system. However, encoding schemes that support more bits per symbol also tend to be less resilient to wireless link impairments, such as distortion, attenuation, cross-talk, and other types of interference. Thus, in some situations, using fewer bits per symbol (e.g., QPSK) may be more effective than using more bits per symbol (e.g., 64-QAM).

In order to adapt to changing wireless conditions between a given WCD and RAN 130, the given WCD and/or RAN 130 may change the encoding that it uses on a per frame, per slot, or per symbol basis. Thus, for instance, if RAN 130 determines that the given WCD is receiving the transmissions of RAN 130 with a poor signal quality, RAN 130 may change to an encoding that supports fewer bits per symbol. Conversely, if RAN 130 determines that the given WCD is receiving the transmissions of RAN 130 with a good signal quality, RAN 130 may change to an encoding that supports more bits per symbol.

Regardless of the exact operation of the forward link, the RAN may receive or generate data, in the form of packets, to transmit to a WCD. It should be understood that a "packet" discussed herein may not necessarily be a network protocol packet, such as an IP packet, that is well-known in the art. In particular, an IP packet may comprise one or more packets. Nonetheless, these packets may be still too large to fit into just one forward link TDM slot. Thus, the RAN may need to divide the packets into smaller subpackets that will fit into a slot. The exact length in bits of each subpacket may vary based on the number of symbols per slot and the number of bits per symbol. Furthermore, the RAN may transmit each individual packet according to a hybrid ARQ protocol.

CDMA, WIMAX®, and other types of wireless protocols may use hybrid ARQ in order accommodate the lossy nature of wireless communication links. However, hybrid ARQ may be used by any type of wireless or wireline protocol, not just the protocols or protocol families discussed herein. According to hybrid ARQ procedures, for each packet that a RAN seeks to transmit a WCD, the RAN may instead transmit between one and N subpackets. Each subpacket may contain some combination of data from the packet and/or error correcting codes.

The error correcting codes may include redundant information derived from the content of the packet. The RAN may insert these codes into subpackets to effectuate a form of forward error correction. Thus, a WCD may have a higher probability of being able to properly decode a packet from one or more subpackets. Popular types of error correcting codes include Reed-Solomon codes and turbo codes, and CDMA, WIMAX®, and other wireless systems may use these or other types of error correcting codes.

In typical hybrid ARQ operation, an access node (or another RAN component) may transmit a first subpacket to a WCD. The first subpacket may contain data, error correcting codes, or a combination of data and error correcting codes. Upon receiving the first subpacket, the WCD may attempt to decode the packet from the content of the first subpacket. If the WCD is successful in doing so, it may transmit an H-ARQ ACK message to the access node, indicating that the packet has been successfully received. In this case, the access node may not transmit any further subpackets of the packet to the WCD.

On the other hand, if the WCD cannot decode the packet from the first subpacket, the WCD may transmit an H-ARQ NACK message to the access node, indicating that the WCD requires more subpackets derived from the packet before it can successfully decode the packet. Upon receiving the H-ARQ NACK for the first subpacket, the access node may transmit a second subpacket to the WCD. The second subpacket may also contain some combination of data and error correcting codes.

It should be understood that while the term "acknowledgement" usually refers to positive acknowledgements (ACKs), it also may be applied to negative acknowledgements (NACKs), as both ACKs and NACKs are specific types of acknowledgements. Thus, with respect to the embodiments herein, the term "acknowledgement" may refer ACKs, NACKs, or both.

The process of the access node transmitting subpackets and the WCD responding with H-ARQ NACKs continues until either: (1) the WCD responds with an ACK for a subpacket, or, (2) the WCD has transmitted a NACK for N subpackets derived from the packet. For purposes of example, N may take on a value of 1, 4, 10, or some other positive integer. The Nth subpacket may be referred to as the "last" subpacket, as the access node preferably will not transmit any further subpackets for the packet if the Nth subpacket is NACKed. The WCD may transmit an L-ARQ ACK message when it successfully decodes the packet from the combination of all N subpackets. On the other hand, the WCD may transmit an L-ARQ NACK message when it fails to decode the packet from the combination of the N subpackets.

The hybrid ARQ procedures for a packet may complete when the WCD transmits a P-ARQ ACK or a P-ARQ NACK message. A P-ARQ ACK message may acknowledge the entire packet, while a P-ARQ NACK message negatively acknowledges the entire packet. A WCD may be arranged to transmit a P-ARQ message to an access node at a fixed or variable offset of time after the WCD receives the first subpacket. Thus, even if the packet is successfully decoded from the first subpacket, the WCD may wait several milliseconds or several tens of milliseconds, or even longer, to transmit a P-ARQ message acknowledging the packet.

CDMA, WIMAX®, and other types of wireless networks may facilitate hybrid ARQ ACK and NACK procedures using three bits transmitted in the reverse direction. These bits may correspond to an H-ARQ, L-ARQ, and P-ARQ message, respectively, and the value of each bit (either zero or one) determines whether the message is an ACK or a NACK.

The value of N is typically determined at the RAN, and may vary from frame to frame or slot to slot. Thus, N may be a number of slots that the RAN expects to be needed for the successful transmission of a packet to the WCD. In that regard, the value of N may be statically configured in the access node, or in any other RAN component. Additionally, the RAN may dynamically determine the value of N, from time to time, based on signal strength reports from the WCD. For instance, if the WCD reports high signal strength, the RAN may select a lower value of N. Conversely, if the WCD reports low signal strength, the RAN may select a higher value of N. In this way, the RAN may attempt to compensate for poor wireless connectivity to the WCD by allocating more slots for transmission of a packet.

Regardless of how N is determined, if fewer slots are used (e.g., k slots are used, where k<N), then the remaining N-k slots may be used for transmissions to other WCDs. The phenomenon of a packet taking fewer slots to be transmitted than has been allocated for that packet by hybrid ARQ procedures is ETG.

One method for representing ETG is to calculate N/k for each packet that an access node transmits via a given wireless coverage area. Thus, for example, if N=4 and k=4, all of the allocated slots have been used, and the ETG is 1. However, if N=4 and k=2, only half of the allocated slots have been used, and the ETG is 2. In general, the greater the ETG, the more efficient the transmission of the packet. If a packet is not successfully decoded by the WCD after all of the packet's N slots have been used, then the ETG for the packet may be given a value of 0 (zero).

Figure 4A:
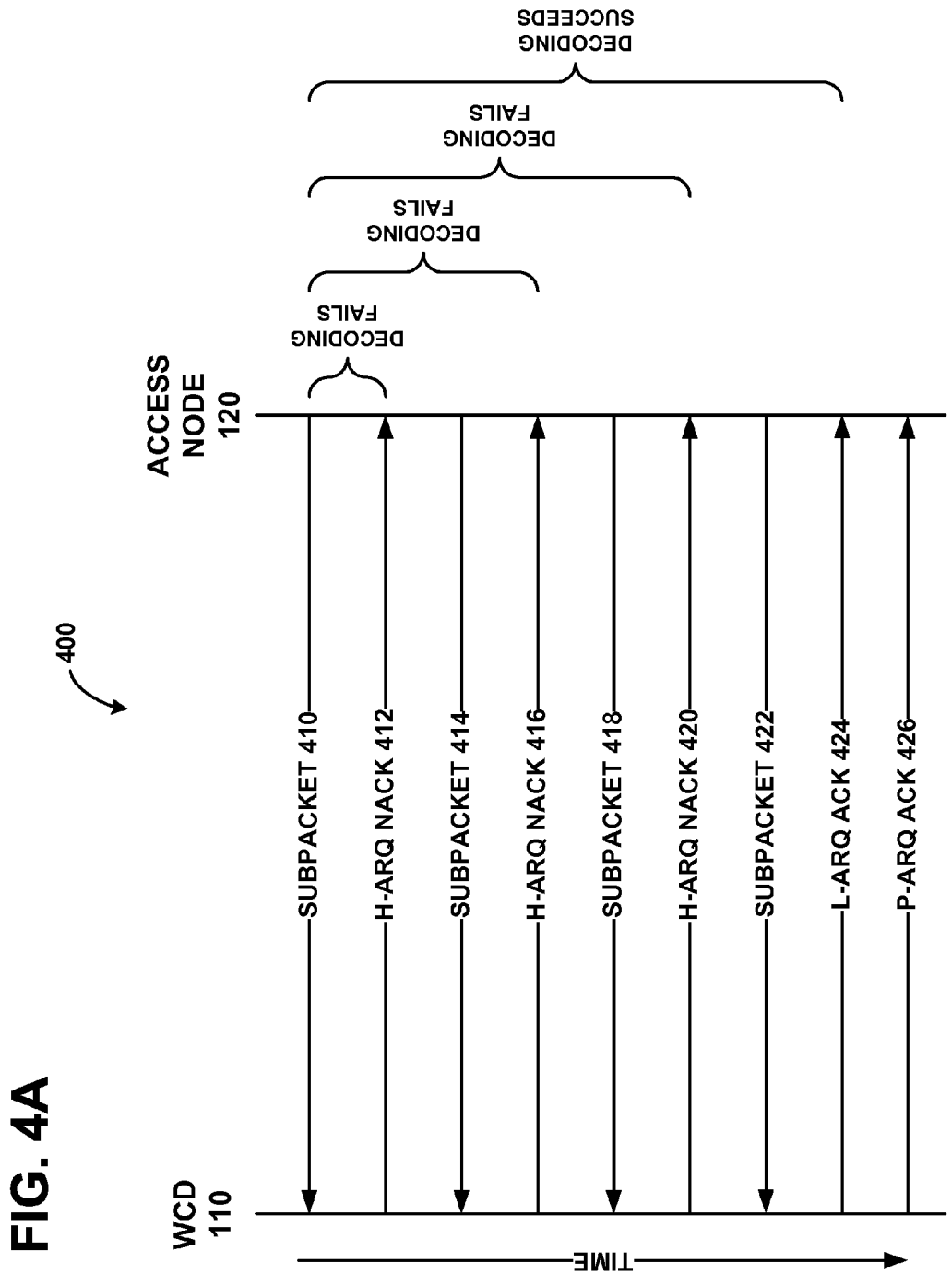
FIG. 4A depicts a series of hybrid automatic repeat request (ARQ) transmissions, in accordance with an exemplary embodiment.
Figure 4B:
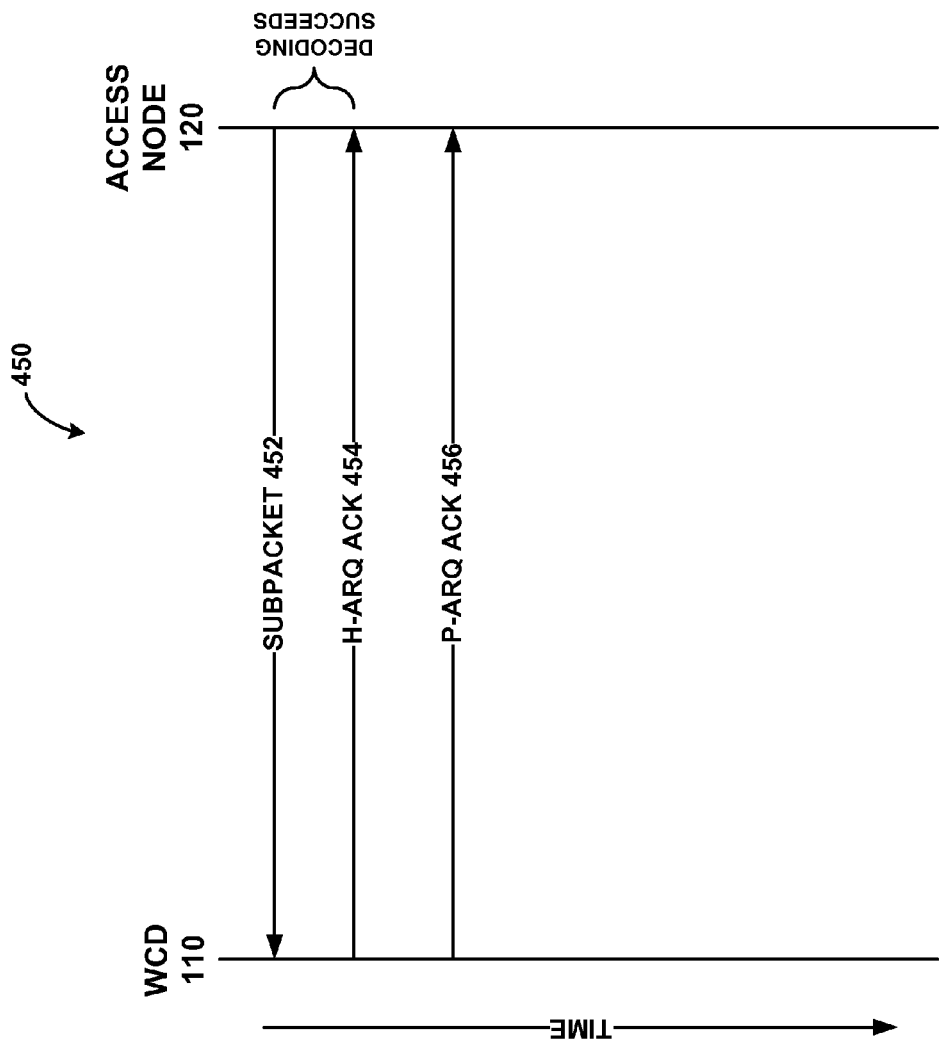
FIG. 4B depicts another series of hybrid ARQ transmissions, in accordance with an exemplary embodiment.

FIGS. 4A and 4B further illustrate the hybrid ARQ protocol for N=4. FIG. 4A depicts a scenario resulting in an ETG of 1, while FIG. 4B depicts a scenario resulting in an ETG of 4. In FIG. 4A, example call flow 400 shows hybrid ARQ procedures for a single packet. Access node 120 may first transmit subpacket 410 to WCD 110. WCD 110 may fail to decode the packet from subpacket 410, so WCD 110 may transmit H-ARQ NACK 412 to access node 120. Access node 120 may responsively transmit subpacket 414 to WCD 110. WCD 110 may then attempt to decode the packet from the combination of subpacket 410 and subpacket 414. Failing to do so, WCD 110 may transmit H-ARQ NACK 416 to client node 110.

Once again, access node 120 may transmit another subpacket, subpacket 418, to WCD 110. WCD 110 may attempt, but fail, to decode the packet from the combination of subpacket 410, subpacket 414, and subpacket 418. Accordingly, WCD 110 may transmit H-ARQ NACK 420 to access node 120. Access node 120 may then transmit subpacket 422, the fourth subpacket, to WCD 110. This time, WCD 110 may succeed in decoding the packet from the combination of subpackets 410, 414, 418, and 422, and therefore may transmit L-ARQ ACK 424 to access node 120. Note that WCD 110 may use an L-ARQ ACK rather than an H-ARQ ACK for this message because WCD 110 is acknowledging the Nth subpacket.

At this point, WCD 110 has successfully received the entire original packet. Accordingly, WCD 110 may transmit P-ARQ ACK 426 to access node 120, in order to acknowledge receipt of the packet. Once WCD 110 transmits P-ARQ ACK 426, it may pass the received packet up to higher layer protocols on WCD 110, such as a data link layer or network layer protocol, for further processing. Once access node 120 receives P-ARQ ACK 426, access node 120 may delete the packet from it's transmit buffer, and then continue transmitting packets, in the form of subpackets, to WCD 110 or other WCDs.

Call flow 400 illustrates an example hybrid ARQ packet transmission with an ETG of 1, as 4 slots were allocated for transmission of the packet, and 4 slots were used for transmission of the packet. For purposes of further illustration, FIG. 4B depicts a call flow 450 that exhibits an ETG of 4.

In call flow 450, it is again assumed that N is 4 and that access node 120 is attempting to transmit a packet to WCD 110. Accordingly, access node 120 may transmit a first subpacket, subpacket 452, to WCD 110. WCD 110 may successfully decode the entire original packet from just subpacket 452, and therefore may transmit H-ARQ ACK 454 to access node 120. At this point, the packet can be processed further by WCD 110, and WCD 110 may also transmit P-ARQ ACK 456 to access node 120.

Since 4 slots were allocated for transmission of the packet, but only 1 slot was used for this transmission, the ETG for the example hybrid ARQ packet transmission illustrated in FIG. 4B is 4. Thus, the example hybrid ARQ packet transmission of FIG. 4B is arguably 4 times more efficient than that of FIG. 4A.

There are many reasons why some hybrid ARQ packet transmissions may exhibit a greater ETG than others. For instance, the ETG for any BTS/WCD pairing may fluctuate due to interference, attenuation, and/or distortion on the wireless coverage area of the BTS that serves the WCD. Furthermore, any movement on the part of the WCD may also impact the ETG.

A. Measuring ETG

In order for a RAN to use ETG as a factor for assigning a WCD to a wireless coverage area, the RAN may first measure ETG across one or more candidate wireless coverage areas. The RAN can measure ETG in a number of ways. In this section several methods of determining an ETG for a wireless coverage area are presented. However, these methods are exemplary and the embodiments herein should not be limited to just using these methods.

Since ETG may vary from packet to packet and from WCD to WCD within the same wireless coverage area, it may be beneficial for the RAN to measure ETG for multiple packets transmitted to multiple WCDs over a period of time to determine an aggregate ETG for the wireless coverage area. For instance, the RAN may measure and record a representation of the ETG for each packet the RAN transmits to one or more WCDs. Then the RAN may calculate an average ETG for the wireless coverage area over the most recent X packets or Y seconds. The RAN may use this average ETG as a representation of the expected ETG that the wireless coverage area would exhibit for the next X packets or Y seconds.

Thus, for example, a RAN may measure and determine that the average ETG for a given wireless coverage area over a period of time was 2.5. Then, the RAN may use the value of 2.5 as the expected ETG for the given wireless coverage area for the next 10 seconds. During these 10 seconds, the RAN may continue measure the ETG of packets transmitted using the given wireless coverage area, and at the end of the 10 seconds, may replace the expected ETG of the wireless coverage area with a new value. For instance, if the RAN determines that at the end of the 10 second period the average ETG was 3.2, the RAN may replace the average ETG value of 2.5 with 3.2. Then the RAN may use this new value as the expected ETG of the given wireless coverage area for the next 10 seconds.

The average ETG that the RAN determines may take various forms, such as a weighted average, a moving average, or an autoregressive average, so that the results of previous measurement periods are also considered. Furthermore, any component of the RAN may measure and/or record the per-packet ETG values, as well as determine the average ETG. Thus, for example, a BTS may measure and calculate ETGs associated with its wireless coverage areas, and an access node may query ETG information from the BTS as needed. The determination of an average ETG value per wireless coverage area could occur at the BTS or at the access node.

B. Using ETG Measurements

Preferably, a RAN uses measured ETG values to determine how to assign WCDs to wireless coverage areas. For instance, when a WCD requests such an assignment, the RAN may choose a candidate wireless coverage area that has recently exhibited the highest ETG of all candidate wireless coverage areas.

Assigning WCDs to wireless coverage areas based on ETG may be more efficient than assigning WCDs to wireless coverage areas based just on other factors. For instance, a WCD may receive pilot signals from a set of candidate wireless coverage areas, and record the respective strengths of each of these pilot signals. From time to time, for instance when the WCD is seeking an assignment to a wireless overage area, the WCD may transmit at least some of these pilot signal strengths to the RAN. The RAN may assign the WCD to a given wireless coverage area, such as the wireless coverage area from which the WCD receives the strongest pilot signal, based on these reported pilot signal strengths. In doing so, the RAN may be attempting to provide the WCD with wireless service that is likely to result in high forward link data rates for the WCD.

However, even if the WCD is assigned to a wireless coverage area from which it receives a strong pilot signal, the WCD may not necessarily be able to communicate at a high data rate via that wireless coverage area. For instance, if the average ETG for the wireless coverage area is low, then the capacity of the wireless coverage area may be used inefficiently, and therefore there may be little capacity available to the WCD in spite of the strength of the wireless coverage area's pilot signal. Therefore, it is advantageous for the RAN to take factors beyond just pilot signal strength into consideration when assigning WCDs to wireless coverage areas.

IV. Link Utilization

In an effort to further increase efficiency, the RAN may take link utilization, as well as ETG into consideration. For instance, the RAN may determine, for each candidate wireless coverage area, a forward link utilization, a reverse link utilization, and/or a backhaul link utilization, and use one or more of these factors, in addition to ETG, when assigning WCDs to wireless coverage areas.

In particular, the RAN may determine a set of candidate wireless coverage areas for a WCD, and then eliminate one or more wireless coverage areas with heavy utilization from the set. In this way, the RAN may more effectively balance load across candidate wireless coverage areas by avoiding assignment of a WCD to a wireless coverage area that has a high ETG, but is also heavily utilized.

The RAN may determine a forward link utilization for a wireless coverage area by calculating the ratio of forward link capacity allocated to WCDs to total forward link capacity. The result may be a percentage represented as number between 0 and 1, inclusive. For example, suppose that the forward link operates according to TDM. If each TDM frame consists of 10 slots, and on average 9 of these slots are used per frame, then the forward link utilization may be 0.9, or 90%. Note that forward link utilization may be high when ETG is either high or low, and thus forward link utilization and ETG may not be correlated.

Similarly, the RAN may determine a reverse link utilization by calculating the ratio of reverse link capacity allocated to WCDs to total forward link capacity. If the reverse link operates according to TDM, then the RAN can calculate reverse link utilization in an analogous fashion to how the RAN can calculate forward link utilization where the forward link uses TDM. However, some wireless technologies may not use TDM on reverse links. Thus, an alternative method for calculating reverse link utilization may be useful.

In wireless network technologies such as CDMA, reverse links might not use TDM. Instead each active WCD may be assigned a unique medium access control identifier (MAC_ID), and may transmit to the RAN as needed using a unique CDMA code. For example, in CDMA Evolution Data Only (EVDO) Revision A, MAC_IDs may comprise an integer between 0 and 127, with MAC_IDs 6-63 and 72-127 being available to be assigned to WCDs. A MAC_ID may serve as a dynamically assigned address for the each WCD. Thus, reverse link utilization for a wireless coverage area may also be measured by the ratio of allocated MAC_IDs to total MAC_IDs, represented as number between 0 and 1, inclusive. For example, in a CDMA Revision A wireless coverage area, if 100 out of 114 available MAC_IDs are allocated to WCDs, then the reverse link utilization of the wireless coverage area may be approximately 0.877, or 87.7%.

In addition to forward link and reverse link utilizations, the RAN may also determine a backhaul link utilization for each candidate wireless coverage area. For example, the RAN may calculate a ratio of utilized capacity to available capacity for each backhaul link associated with each candidate wireless coverage area. The result may also be represented as number between 0 and 1, inclusive. Furthermore, backhaul link capacity may include both forward direction (to the RAN) capacity, reverse direction (from the RAN) capacity, or both.

Of course, there may many ways of determine each of these utilizations, and the calculations described above are merely for purposes of example and are not intended to be limiting. For instance, each of the determined forward link, reverse link, and backhaul link capacities may be represented as a smoothed average of measurements, such as an average percentage of utilized capacity calculated over a number of measurements taken over a period of time.

V. Example Methods

In order to further explain how ETG measurements can be used to assign WCDs to wireless coverage areas, FIGS. 5 and 6 depict methods for assigning a WCD to a wireless coverage area based on ETG. Optionally, link utilization measurements may also be used to influence this assignment. These methods take the form of an example call flow and an example flow chart, respectively, of embodiments in accordance with this invention. The methods depicted in these figures comprise a number of steps to be carried out by a WCD or RAN components. However, it should be understood that for each method depicted in FIGS. 5 and 6, more or fewer steps may be used, and the steps may occur in a different order. Furthermore, these methods may be combined with one another, in whole or in part, and still be within the scope of the preferred embodiments.

FIG. 5 is a call flow 500 depicting an access node 120 assigning a WCD 110 to a wireless coverage area. At step 510, WCD 110 transmits a connection request message to access node 120. Preferably, this connection request message requests an assignment of the WCD to one of a set of candidate wireless coverage areas. At steps 512 and 514, in response to receiving the connection request message, access node 120 queries BTS 112 and BTS 114 for the ETG of the candidate wireless coverage areas in the set. Here it is assumed that all candidate wireless coverage areas in the set are defined by either BTS 112 or BTS 114.

At steps 516 and 518, BTS 112 and BTS 114, respectively, respond to the queries with the requested ETG(s). Note that steps 512, 514, 516, and 518 may be optional, because access node 120 may be able to determine the ETG(s) itself, or by querying other entities.

At step 520, based on the ETG(s), access node 120 may select a wireless coverage area to assign WCD 110, and at step 522, access node 120 may transmit a message to WCD 110, notifying WCD 110 that it has been assigned to the selected wireless coverage area. WCD may then tune to the selected wireless coverage area and, at step 524, use the selected wireless coverage area to exchange bearer traffic with the RAN or other endpoints.

FIG. 6 is a flow chart depicting method 600, preferably performed by a RAN component, such as an access node, to assign a WCD to a wireless coverage area. The RAN component may be part of a RAN that radiates to define a first, a second, and a third wireless coverage area.

At step 610, the RAN component receives, from the WCD, a message that requests assignment of the WCD to a candidate wireless coverage area. Optionally, the message may specify a plurality of candidate wireless coverage areas, including the first, the second, and the third wireless coverage area. The WCD may transmit the message from an idle state, or the WCD may already be allocated a bearer channel in a wireless coverage area and is requesting a handoff to a new wireless coverage area. In the former case, method 600 may comprise a registration process for the WCD, wherein the WCD registers for service with the RAN.

Regardless of why the WCD transmits the message, at step 615 the RAN may remove the third wireless coverage area from candidacy. For example, the RAN may determine (i) a first utilization for the first wireless coverage area, (ii) a second utilization for the second wireless coverage area, and (iii) a third utilization for the third wireless coverage area. The RAN may further determine that the third utilization exceeds a utilization threshold, and accordingly remove the third wireless coverage area from candidacy for serving the WCD. Note that step 615 is an optional step, as the RAN may not remove any wireless coverage areas from candidacy.

The first, second, and third utilizations considered in step 615 may be forward link utilizations, reverse link utilizations, backhaul link utilizations, or some other type of utilization. In particular, if the utilizations are backhaul link utilizations, then it is possible for more than one of the candidate wireless coverage areas to be associated with the same backhaul links. In this case, the backhaul link utilization for two or more of the candidate wireless coverage areas may be the same.

At step 620 the RAN component may determine an early termination gain (ETG) respectively associated with each of the remaining candidate wireless coverage areas. This includes, at least, a first ETG associated with the first wireless coverage area and a second ETG associated with the second wireless coverage area.

Preferably, each of the first and second wireless coverage areas include forward links on which the RAN schedules packet transmissions to WCDs served by each respective wireless coverage area. These forward links may operate according to TDM. Thus, for example, on the forward link of the first wireless coverage area, the RAN may allocate TDM slots on the each packet the RAN transmits on the first wireless coverage area. The RAN may use at least some of the allocated TDM slots to transmit the packet. In this way, the RAN component may determine the first ETG based on a first ratio of (i) TDM slots allocated for a first set of packets transmitted on the first forward link to (ii) TDM slots used for the first set of packets transmitted on the first forward link. The RAN component may use a similar method of determining the second ETG.

In one embodiment, the RAN component may be an access node, and at least one BTS may radiate to define the plurality of candidate wireless coverage areas. In this case, the RAN component may determine the ETG(s) by querying the at least one BTS and receiving, from the at least one BTS, the ETG for each of the specified candidate wireless coverage areas.

At step 625 the RAN component may select one of the first wireless coverage area and the second wireless coverage area based on the determined ETGs, and, at step 630, the RAN component may assign the WCD to the selected wireless coverage area. After assigning the WCD to the selected wireless coverage area, at step 635 the RAN component may exchange bearer traffic with the WCD via the selected wireless coverage area. Note that if the WCD requested a particular wireless coverage area at step 610, the RAN may or may not have assigned the same wireless coverage area at step 630.

VI. Example RAN Component

Figure 7:
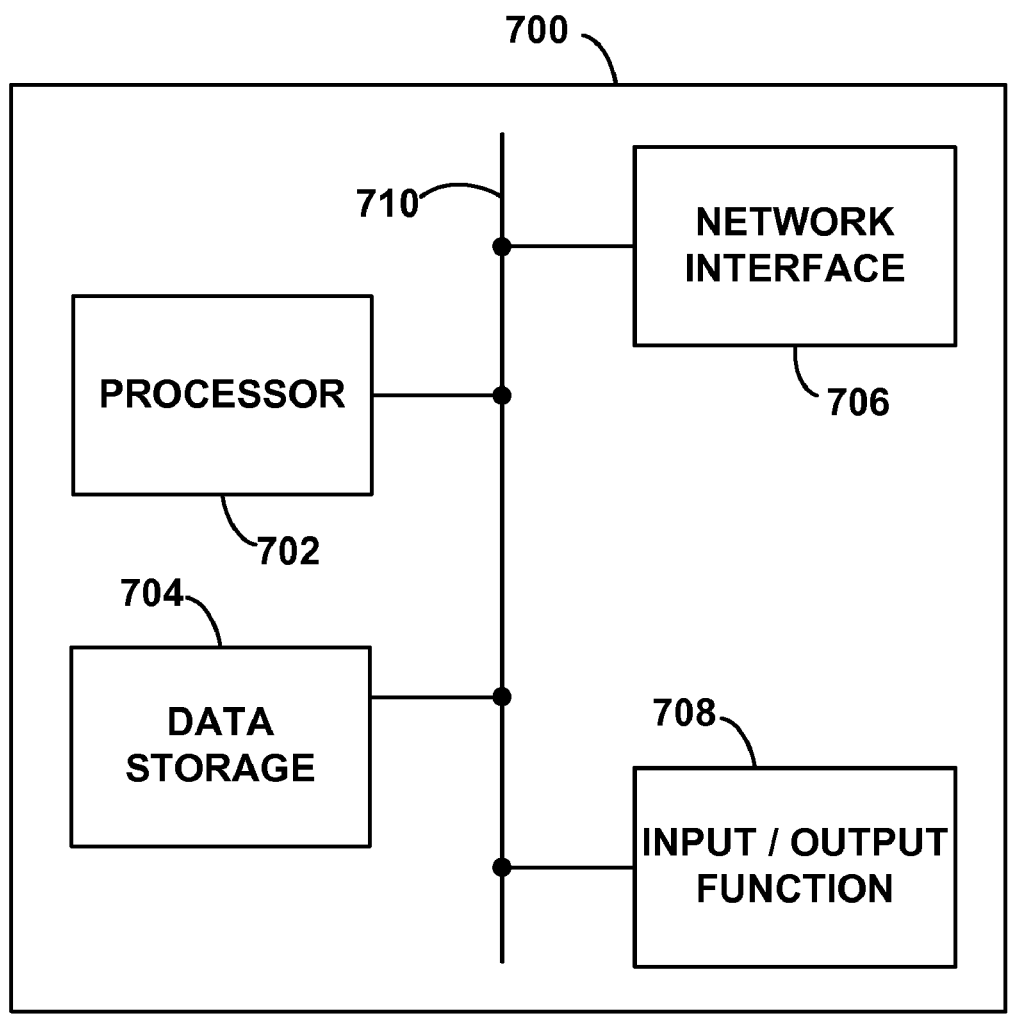
FIG. 7 depicts a RAN component, in accordance with an exemplary embodiment.

FIG. 7 is a simplified block diagram depicting exemplary RAN component 700. FIG. 7 illustrates some of the functional components that would likely be found in a RAN component arranged to operate in accordance with the embodiments herein. Example RAN component 700 preferably includes a processor 702, a data storage 704, a network interface 706, and an input/output function 708, all of which may be coupled by a system bus 710 or a similar mechanism.

Processor 702 preferably includes one or more CPUs, such as one or more general purpose processors and/or one or more dedicated processors (e.g., application specific integrated circuits (ASICs) or digital signal processors (DSPs), etc.) Data storage 704, in turn, may comprise volatile and/or non-volatile memory and can be integrated in whole or in part with processor 702. Data storage 704 preferably holds program instructions executable by processor 702, and data that is manipulated by these instructions, to carry out various logic functions described herein. Alternatively, the logic functions can be defined by hardware, firmware, and/or any combination of hardware, firmware and software.

Network interface 706 may take the form of a wireline connection, such as an Ethernet, Token Ring, SONET, or T-carrier connection. Network interface 706 may also take the form of a wireless connection, such as IEEE 802.11, BLUETOOTH®, CDMA, WIMAX®, UMTS®, LTE®, or any other interface used to communicate with client nodes. However, other forms of physical layer connections and other types of standard or proprietary communication protocols may be used over network interface 706. Furthermore, network interface 706 may comprise multiple physical or logical network interfaces, each capable of operating according to the same or different protocols.

Input/output function 708 facilitates user interaction with example RAN component 700. Input/output function 708 may comprise multiple types of input devices, such as a keyboard, a mouse, a touch screen, and so on. Similarly, input/output function 708 may comprise multiple types of output devices, such as a monitor, printer, or one or more light emitting diodes (LEDs). Additionally or alternatively, example RAN component 700 may support remote access from another device, via network interface 706 or via another interface (not shown), such an RS-232 port.

By way of example, the data in data storage 704 may contain information associated with performing any of the methods, processes, or functions described herein or represented by any of the accompanying figures. Data storage 704 may also contain program instructions that are executable by processor 702 to perform any of the methods, processes, or functions presented herein or represented by any of the accompanying figures.

VII. Conclusion

Exemplary embodiments have been described above. Those skilled in the art will understand, however, that changes and modifications may be made to these embodiments without departing from the true scope and spirit of the invention, which is defined by the claims.

What is claimed is:

1. A method for assigning a wireless communication device (WCD) to a wireless coverage area, wherein a radio access network (RAN) radiates to define a first wireless coverage area and a second wireless coverage area, the method comprising:
    the RAN receiving, from the WCD, a connection request message that specifies a plurality of candidate wireless coverage areas including the first wireless coverage area and the second wireless coverage area, and that functions to request assignment of the WCD to any one of the specified candidate wireless coverage areas;
    the RAN determining an early termination gain (ETG) respectively associated with each of the specified candidate wireless coverage areas, including a first ETG associated with the first wireless coverage area and a second ETG associated with the second wireless coverage area;
    responsive to the connection request, the RAN (i) selecting one of the first wireless coverage area and the second wireless coverage area based on the determined ETGs, and (ii) assigning the WCD to the selected wireless coverage area; and
    after assigning the WCD to the selected wireless coverage area, the RAN exchanging bearer traffic with the WCD via the selected wireless coverage area.

2. The method of claim 1, wherein the first wireless coverage area includes a first forward link on which the RAN schedules packet transmissions to WCDs served by the first wireless coverage area, wherein for each packet that the RAN transmits on the first forward link, the RAN (i) allocates time division multiplexed (TDM) slots on the first forward link, and (ii) the RAN uses at least some of the allocated TDM slots to transmit the packet, and wherein the RAN determining the first ETG comprises:
    the RAN calculating the first ETG based on a first ratio of (i) TDM slots allocated for a first set of packets transmitted on the first forward link to (ii) TDM slots used for the first set of packets transmitted on the first forward link.

3. The method of claim 2, wherein the second wireless coverage area includes a second forward link on which the RAN schedules packet transmissions to WCDs served by the second wireless coverage area, wherein for each packet that the RAN transmits on the second forward link, the RAN (i) allocates TDM slots on the second forward link, and (ii) the RAN uses at least some of the allocated TDM slots on the second forward link to transmit the packet, and wherein the RAN determining the second ETG comprises:
    the RAN calculating the second ETG based on a second ratio of (i) TDM slots allocated for a second set of packets transmitted on the second forward link to (ii) TDM slots used for the second set of packets transmitted on the second forward link.

4. The method of claim 1, wherein the plurality of candidate wireless coverage areas includes a third wireless coverage area, the method further comprising:
    in response to receiving the connection request message, the RAN determining (i) a first utilization for the first wireless coverage area, (ii) a second utilization for the second wireless coverage area, and (iii) a third utilization for the third wireless coverage area;
    the RAN determining that the third utilization exceeds a utilization threshold; and
    based on the third utilization exceeding utilization threshold, the RAN removing the third wireless coverage area from candidacy for serving the WCD.

5. The method of claim 4, wherein each of the first wireless coverage area, the second wireless coverage area and the third wireless coverage area includes a respective forward link on which the RAN transmits packets to WCDs served by the respective wireless coverage area, and wherein each of the first utilization, the second utilization, and the third utilization comprise a forward link utilization.

6. The method of claim 4, wherein each of the first wireless coverage area, the second wireless coverage area and the third wireless coverage area includes a reverse link on which the RAN receives packet transmissions from WCDs served by the respective wireless coverage area, wherein each of the first utilization, the second utilization, and the third utilization comprise a reverse link utilization.

7. The method of claim 4, wherein the RAN connects to one or more other networks via a set of at least one backhaul link, wherein the first utilization is of a first backhaul link from the set, wherein the second utilization is of a second backhaul link from the set, and wherein the third utilization is of a third backhaul link from the set.

8. The method of claim 7, wherein first backhaul link and the second backhaul link are the same backhaul link.

9. The method of claim 1, wherein selecting one of the first wireless coverage area and the second wireless coverage area based on the determined ETGs further comprises:
    the RAN determining which of the first wireless coverage area and the second wireless coverage area has a highest determined ETG of the first wireless coverage area and the second wireless coverage area; and
    the RAN selecting the determined wireless coverage area.

10. The method of claim 1, wherein the RAN comprises (i) an access node, and (ii) at least one base transceiver station (BTS) that radiates to define the plurality of candidate wireless coverage areas, and wherein the RAN determining the ETG for each of the specified candidate wireless coverage areas further comprises:
    the access node querying the at least one BTS; and
    the access node receiving, from the at least one BTS, the ETG for each of the specified candidate wireless coverage areas.

11. The method of claim 1, wherein the RAN operates according to code division multiple access, and wherein each of the plurality of candidate wireless coverage areas is associated with a unique pseudo-noise code.

12. The method of claim 1, wherein the connection request message requests a given wireless coverage area from the plurality of candidate wireless coverage areas, and the selected wireless coverage area is different from the given wireless coverage area.

13. The method of claim 1, wherein assigning the WCD to the selected wireless coverage area is part of a handoff process for the WCD.

14. The method of claim 1, wherein assigning the WCD to the selected wireless coverage area is part of registration process for the WCD.

15. A method for assigning a wireless communication device (WCD) to a wireless coverage area, wherein a radio access network (RAN) radiates to define a set of candidate wireless coverage areas, the method comprising:

the RAN receiving, from the WCD, a connection request message that specifies the set of candidate wireless coverage areas and that functions to request assignment of the WCD to any one of the specified candidate wireless coverage areas;

the RAN eliminating at least one candidate wireless coverage area from the set due to the at least one candidate wireless coverage area exhibiting a utilization above a utilization threshold;

the RAN determining an early termination gain (ETG) respectively associated with each remaining candidate wireless coverage areas in the set, wherein the ETG for a given remaining candidate wireless coverage area in the set comprises the efficiency at which the RAN has transmitted packets to WCDs using the given remaining candidate wireless coverage area;

responsive to the request, the RAN (i) selecting a wireless coverage area from the remaining candidate wireless coverage areas in the set based on the selected wireless coverage area exhibiting a highest determined ETG of all remaining candidate wireless coverage areas, and (ii) assigning the WCD to the selected wireless coverage area; and after assigning the WCD to the selected wireless coverage area, the RAN exchanging bearer traffic with the WCD via the selected wireless coverage area.

16. A RAN component for providing service to a wireless communication device (WCD) via a plurality of wireless coverage areas, the RAN component comprising:

a processor;

a data storage; and program instructions stored in the data storage and executable by the processor to (i) receive, from the WCD, a connection request message that specifies a plurality of candidate wireless coverage areas including the first wireless coverage area and the second wireless coverage area, and that functions to request assignment of the WCD to any one of the specified candidate wireless coverage areas, (ii) determine an early termination gain (ETG) respectively associated with each of the specified candidate wireless coverage areas, including a first ETG associated with the first wireless coverage area and a second ETG associated with the second wireless coverage area, (iii) responsive to the connection request, select one of the first wireless coverage area and the second wireless coverage area based on the determined ETGs, (iv) assign the WCD to the selected wireless coverage area, and (v) after assigning the WCD to the selected wireless coverage area, exchange bearer traffic with the WCD via the selected wireless coverage area.

17. The RAN component of claim 16, wherein the plurality of candidate wireless coverage areas includes a third wireless coverage area, the RAN component further comprising:

program instructions stored in the data storage and executable by the processor to (i) in response to receiving the connection request message, determine a first utilization for the first wireless coverage area, a second utilization for the second wireless coverage area, and a third utilization for the third wireless coverage area, (ii) determine that the third utilization exceeds a utilization threshold, and (iii) based on the third utilization exceeding utilization threshold, remove the third wireless coverage area from candidacy for serving the WCD.

18. The RAN component of claim 17, wherein each of the first wireless coverage area, the second wireless coverage area and the third wireless coverage area includes a respective forward link on which the RAN transmits packets to WCDs served by the respective wireless coverage area, and wherein each of the first utilization, the second utilization, and the third utilization comprise one of a forward link utilization and a reverse link utilization.

19. The RAN component of claim 16, wherein the first wireless coverage area includes a first forward link on which the RAN schedules packet transmissions to WCDs served by the first wireless coverage area, wherein for each packet that the RAN transmits on the first forward link, the RAN (i) allocates time division multiplexed (TDM) slots on the first forward link, and (ii) uses at least some of the allocated TDM slots to transmit the packet, the RAN component further comprising:

program instructions stored in the data storage and executable by the processor to calculate the first ETG based on a first ratio of (i) TDM slots allocated for a first set of packets transmitted on the first forward link to (ii) TDM slots used for the first set of packets transmitted on the first forward link.

20. The RAN component of claim 16, wherein the RAN component is communicatively linked to at least one base transceiver station (BTS) that radiates to define the plurality of candidate wireless coverage areas, and wherein determining the early termination gain (ETG) respectively associated with each of the specified candidate wireless coverage areas further comprise:

program instructions stored in the data storage and executable by the processor to (i) query the at least one BTS, and (ii) receive, from the at least one BTS, the respective ETG for each of the specified candidate wireless coverage areas.

\* \* \* \* \*